April 29, 1930.  H. E. KEMPTON ET AL  1,756,124
WORKHOLDER
Filed Jan. 16, 1925
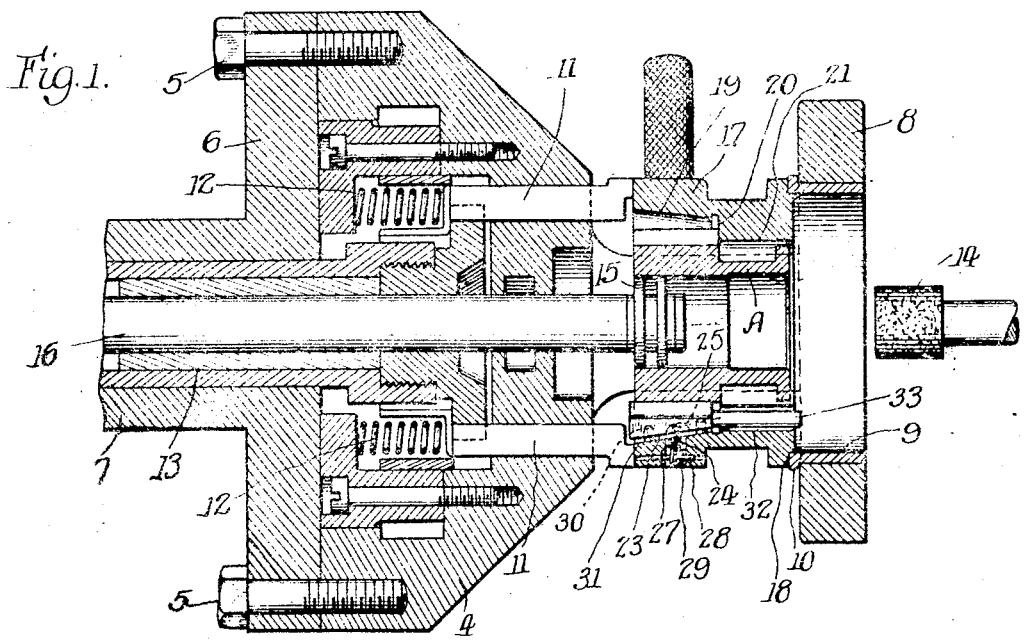
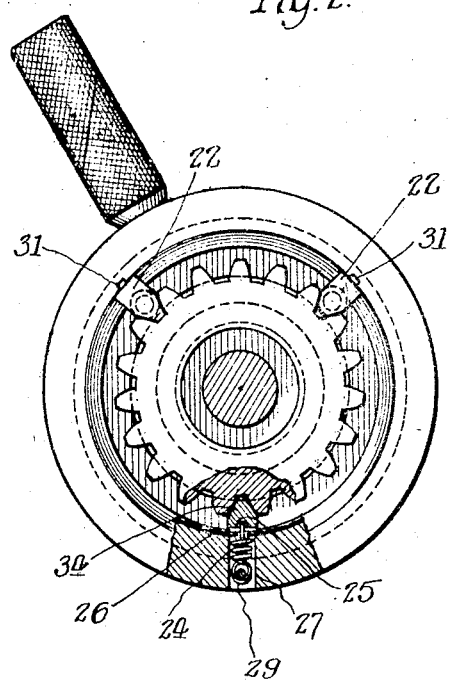
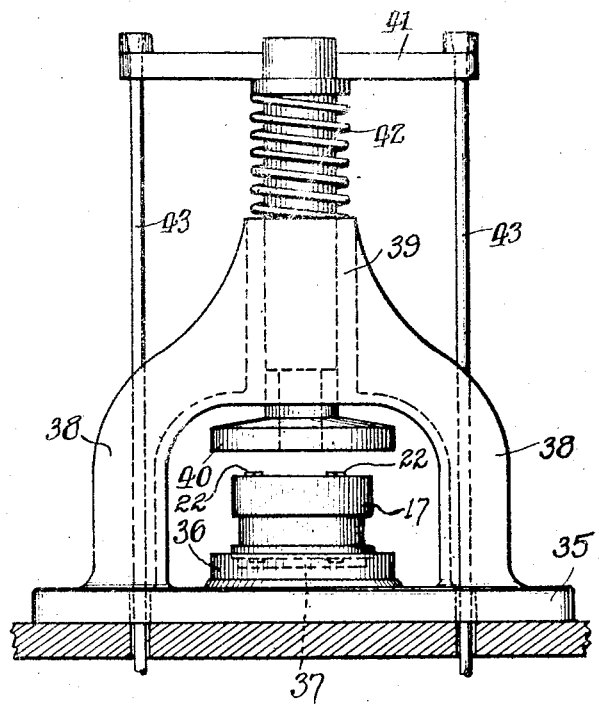
Inventors:
Herbert E. Kempton,
Keith F. Gallimore,
Raymond M. Woytych, Patented Apr. 29, 1930

1,756,124

UNITED STATES PATENT OFFICE

HERBERT E. KEMPTON, KEITH F. GALLIMORE, AND RAYMOND M. WOYTYCH, OF FOND DU LAC, WISCONSIN, ASSIGNORS, BY MESNE ASSIGNMENTS, TO THE HEALD MACHINE COMPANY, OF WORCESTER, MASSACHUSETTS, A CORPORATION OF MASSACHUSETTS

WORK HOLDER

Application filed January 16, 1925. Serial No. 2,776.

Our invention relates to improvements in work holding devices for machine tools, and has particular reference to a portable shuttle or work holder of the type disclosed in the copending application, Serial No. 680,826, of Kempton and Gallimore, filed December 15, 1923, and in our copending application, Serial No. 728,063, filed July 25, 1924. (The above named applications have now resulted respectively in Patent No. 1,687,981 granted October 16, 1928, and Patent No. 1,692,379 granted November 20, 1928.) Shuttles of the type referred to are adapted to have work blanks centered and clamped therein, and to be similarly mounted in a machine chuck. This permits one shuttle to be reloaded while the other is in the machine, thereby resulting in a considerable saving in time and labor and in an increased output of the given machine.

The primary object of the invention is to provide a novel shuttle of the above character which is adapted to have gear blanks or other work blanks with irregular surfaces mounted therein.

A further object resides in the provision in a shuttle of the above character of a novel work centering and clamping means which is sturdy in construction, which is easily and quickly actuated, and which will accurately center the work blank without the exercise of a high degree of care or skill.

Other objects and advantages will become apparent as the description proceeds.

In the accompanying drawings, Figure 1 is a longitudinal sectional view of a chuck of suitable construction in which a work shuttle embodying the features of our invention is mounted.

Fig. 2 is an end view of the shuttle with parts broken away to show one of the clamping means in section.

Fig. 3 is a side view of a fixture for loading and unloading the shuttle.

While we have illustrated the preferred embodiment of our invention, it is to be understood that we do not thereby intend to limit the same to the specific form disclosed but aim to cover all modifications and alternative constructions falling within the spirit and scope of the invention as expressed in the appended claims.

The shuttle forming the exemplary embodiment of the invention is adapted to be mounted in a chuck of any suitable construction. The chuck herein illustrated comprises a body 4 which is secured by means of screws 5 to a plate 6 formed integral with a rotatable spindle 7, and which is provided with a front plate 8. A central bushing 9 having a peripheral flange 10 on its inner end is securely mounted in the front plate 8, and is adapted to engage the front end of the part being chucked. Slidably mountd in the body 4 for movement toward and from the bushing 9 are a plurality of spaced clamping members 11 which are adapted to engage the rear end of the part being chucked to clamp the same in centered position. The clamping members 11 are resiliently pressed forwardly by a plurality of coil springs 12, and are adapted to be retracted by means of a suitable draw bar 13 The work blank when mounted with the shuttle in the chuck is positioned to be operated upon by an element such as a grinding wheel 14, and to be gaged by a member 15 on the forward end of a rod 16 extending through the spindle 7.

The shuttle comprises a body 17 which preferably is cylindrical in form. On its front end, the body 17 is formed with an annular notch 18 adapted to fit over the flange 10 of the bushing 9 to center the shuttle in the chuck. The rear end of the body 17 is adapted to be engaged by the clamping members 11 to hold the shuttle securely in centered position.

While it is contemplated that shuttles embodying the features of our invention may be designed for different numbers of work blanks of various shapes and forms, we have herein illustrated one adapted to hold a single gear blank A. The body 17 accordingly is formed in its rear end with a tapered bore 19 concentric with the annular centering notch 18 and adapted to loosely receive the blank A. The inner end of the bore 19 terminates next to an annular shoulder 20 which is defined by a straight bore 21 extending through the front end of the body, and which serves to back up and true the sides of the work blank.

Mounted for longitudinal adjustment in the body 17 are a plurality of clamping jaws 22. In the present instance, three of these jaws are provided, and are mounted in spaced relation on the periphery of the bore 19.

Each jaw 22 is formed with a wedge or tapered surface 23 slidably engaging the tapered surface of the bore 19, and is held resiliently against the same by a spring 24. The inner end of the spring 24 extends into a notch 25 cut lengthwise in the wedge surface 23, and is secured therein by means of a pin 26 extending laterally to the jaw 22. The other end of the spring 24 extends outwardly into a large radial bore 27 in the wall of the body 17, and is therein attached to a pin 28 which is disposed parallel to the clamping jaw. A block 29 on the pin 28 serves to hold the end of the spring 24 near the rear side of the bore 27 thereby causing the spring to resist forward movement of the jaw. The spring while tending to hold the jaw in open position still permits longitudinal and radial movement thereof. A pair of guide pins 30 are mounted in opposite ends of the wedge surface 23, and project into a key-way 31 parallel to the latter and formed lengthwise in the surface of the bore 19. The guide pins 30 prevent lateral displacement of the jaw.

Formed on the forward end of the clamping jaw 22 and extending loosely through a groove or bore 32 next to the surface of and parallel to the bore 21 is a turned extension 33. The outer ends of the jaw 22 and extension 33 project beyond the ends of the body 17 so that the work blank A can be peripherally clamped or released by forcing the jaw longitudinally in either one or the other direction.

The inner edges of the jaws 22 are adapted to engage the gear blank A between the teeth to center and clamp the blank accurately in position in the shuttle. Either of two methods may be employed for this purpose, namely, a pitch control or a root control. In the first method, the jaws 22 are shaped to engage the sides of the teeth at the pitch diameter. In the present instance, the inner edges of the jaws 22 are each formed with a projection 34 having a profile of a character to permit them to engage the roots of the teeth to effect a root control.

It will be evident that the work blank A can be quickly and accurately clamped in centered position by moving the clamping jaws 22 uniformly to the right. In Fig. 3 we have illustrated a loading fixture for this purpose. The fixture comprises a base 35 which is secured to the top of a suitable support, and on which a block 36 is provided. The latter is formed with a hollow 37 to provide suitable space for the lower ends of clamping jaws 22 or the extensions 33. Extending up from the base 35 are a pair of arms 38 which support a vertical guide or sleeve 39 directly over the block 36. A ram 40 is slidably mounted in the guide, and is provided with a cross arm 41 extending through its upper end. The ram 40 is normally held in its upper position by a coil spring 42 positioned thereon between the cross arm 41 and the upper end of the guide 39, and is adapted to be lowered, by means of two flexible cables 43 extending downwardly from the arm 41 through the base 35, to engage the upper ends of the jaws 22 or extensions 33.

In loading a shuttle, the gear blank A is loosely positioned in the bore 19, and the entire device is mounted on the block 36. The ram 40 is then lowered to engage the ends of the clamping jaws 22 thereby forcing them to move along the wedge surface of the bore 19, and radially into engagement with the gear blank A. Since the jaws 22 are moved uniformly the gear blank will be centered and clamped at the same time. To unload the shuttle, it is placed upon the block 36 in the reversed position with the extensions 33 uppermost.

We claim as our invention:

1. A work holding shuttle comprising in combination, a hollow cylindrical body open at both ends having an annular centering notch on one end and having a bore adapted to receive a gear blank in the other end, a plurality of independent clamping jaws shaped to fit between the teeth of a gear mounted for longitudinal and radial movements in said bore, and means for holding said clamping jaws against lateral displacement.

2. A work holding shuttle comprising, in combination, a hollow body open at both ends and having a centering notch and a concentric tapered bore adapted to receive a work blank, a plurality of independent spaced clamping jaws having wedge surfaces slidably coacting with the tapered surface of said bore and shaped to fit between the teeth of a gear, said bore being formed with a plurality of longitudinal keyways, one for each jaw, and means on said jaws engaging said keyways for preventing lateral displacement of said jaws.

3. A work holding shuttle comprising, in combination, a hollow body open at both ends and having a centering notch and a concentric bore formed with a tapered peripheral surface, a plurality of separate independent spaced clamping jaws having wedge surfaces slidably engaging said surface and having clamping surfaces shaped to fit between the teeth of a gear, and spring means connecting said jaws to said body and serving to hold said jaws against said peripheral surface but permitting longitudinal movement thereof to effect a radial movement.

4. A work holding shuttle comprising, in combination, a hollow body open at both ends and having a central bore formed with a tapered peripheral surface, a plurality of separate independent clamping members each of which is formed with a wedge surface slidably engaging said tapered surface, and shaped to fit between the teeth of a gear, a plurality of springs connecting said jaws to said body and serving to hold said clamping jaws against said tapered surface, and means between said tapered surface and said wedge surfaces for preventing lateral displacement of said clamping members.

5. A work holding shuttle comprising, in combination, a body having a bore adapted to receive a work blank and having a plurality of openings communicating with said bore, a plurality of clamping members mounted about said bore, each member being mounted over one of said openings, coil springs holding said clamping members resiliently against the inner peripheral surface of said bore, each coil spring being positioned in one of said openings and being connected at its opposite ends respectively to said body and to the overlying clamping member, and wedge means for causing movement of said clamping members radially upon longitudinal movement thereof.

6. A work holding shuttle comprising, in combination, a body having a tapered bore adapted to receive a work blank and having an annular shoulder at one end of said bore for backing up the work blank, clamping jaws mounted in spaced relation in said bore and having wedge engagement therewith, and individual means for retaining each jaw against the inner surface of said bore.

7. A work holding shuttle having, in combination, a body having a bore adapted to receive a work blank, a plurality of independently mounted clamping jaws engaging the peripheral surface of said bore and being substantially longer than said body, said bore and said jaws having wedge surfaces for effecting radial movement of said members upon longitudinal movement thereof, a plurality of springs, one for each jaw, for holding said jaws against the surface of said bore, and means at one end of said tapered bore for backing up the work blank.

8. In a work holding shuttle, the combination with the shuttle body, a frusto conical bore at one end of said shuttle body, a cylindrical bore at the other end of said shuttle body, said bores communicating with each other and being coaxial, and a shoulder formed at the merging point of said bores, of a plurality of channels formed in said body adjacent the surface of said cylindrical bore, a plurality of clamping members located in said frusto conical bore and having inclined surfaces for wedge engagement therewith, and projections from said clamping members extending through said channels and projecting beyond one end of said shuttle body when said clamping jaws are holding a work piece.

9. In a work holding shuttle, a hollow body open at both ends and having a central bore adapted to receive a gear blank, a plurality of separate independent clamping jaws shaped to fit between the teeth of said gear blank, said jaws being disposed about said bore, wedge means provided by said body and by each jaw adapted to cause said jaws to be wedged against the teeth of said gear blank upon the longitudinal movement thereof, and projecting portions associated with said jaws, a separate portion being provided by each jaw, extending, together with said jaws, a greater distance than the length of said shuttle, whereby the jaws may be independently and separately forced into wedge engagement with said gear blank and likewise independently and separately forced out of engagement therewith by force exerted on the jaws or the projecting portions respectively.

In testimony whereof we have hereunto affixed our signatures.

HERBERT E. KEMPTON.
KEITH F. GALLIMORE.
RAYMOND M. WOYTYCH.